(12) United States Patent
De Oliveira et al.

(10) Patent No.: US 11,436,216 B2
(45) Date of Patent: Sep. 6, 2022

(54) UNIFIED DATABASE TRANSITION TOOL

(71) Applicant: Dell Products L.P., Round Rock, TX (US)

(72) Inventors: Emilio De Oliveira, Porto Alegre (BR); Daniel Gomes, Porto Alegre (BR)

(73) Assignee: Dell Products L.P., Round Rock, TX (US)

( * ) Notice: Subject to any disclaimer, the term of this patent is extended or adjusted under 35 U.S.C. 154(b) by 206 days.

(21) Appl. No.: 16/777,050

(22) Filed: Jan. 30, 2020

(65) Prior Publication Data

US 2021/0240692 A1 Aug. 5, 2021

(51) Int. Cl.
*G06F 16/00* (2019.01)
*G06F 16/23* (2019.01)
*G06N 20/00* (2019.01)
*G06F 16/21* (2019.01)

(52) U.S. Cl.
CPC ........ *G06F 16/2365* (2019.01); *G06F 16/214* (2019.01); *G06N 20/00* (2019.01)

(58) Field of Classification Search
CPC .... G06F 16/214; G06F 16/2365; G06N 20/00
See application file for complete search history.

(56) References Cited

U.S. PATENT DOCUMENTS

| | | | | |
|---|---|---|---|---|
| 6,502,102 B1 * | 12/2002 | Haswell | ............. | G06F 11/3664 707/999.102 |
| 7,620,665 B1 * | 11/2009 | George | ................ | G06F 16/214 |
| 9,811,527 B1 | 11/2017 | Esposito et al. | | |
| 10,776,244 B2 * | 9/2020 | Davis | .................. | G06F 11/3442 |
| 2007/0150488 A1 * | 6/2007 | Barsness | ............... | G06F 16/214 |
| 2009/0327882 A1 * | 12/2009 | Velusamy | .......... | H04L 12/1818 715/269 |
| 2014/0089495 A1 * | 3/2014 | Akolkar | ................ | H04L 41/147 709/224 |
| 2014/0172782 A1 * | 6/2014 | Schuenzel | ............ | G06F 3/0605 707/609 |
| 2015/0019478 A1 * | 1/2015 | Buehne | ................. | G06F 16/214 707/609 |
| 2015/0019479 A1 * | 1/2015 | Buehne | ................. | G06F 16/214 707/609 |
| 2015/0019488 A1 * | 1/2015 | Higginson | ........... | G06F 16/214 707/634 |

(Continued)

*Primary Examiner* — Shiow-Jy Fan
(74) *Attorney, Agent, or Firm* — Daly, Crowley Mofford & Durkee, LLP

(57) ABSTRACT

Disclosed are a system and method for transitioning a database from one computer environment to another according to a standard workflow. An individual issues a command relating to transition to the system, and a transition management processor selects an associated sequence of technical transition processes according to a dynamic, best practices workflow. Each such process is performed by a corresponding module in the system, which is first configured by the processor according to which environment the command pertains. Some of the modules may be built-in, while some of the modules may be provided by third parties, including the database vendor. After each module performs its respective process, it generates a report, and when all modules have completed the processor transmits to the individual a response based on the produced reports, e.g. as a webpage.

19 Claims, 7 Drawing Sheets

(56) References Cited

U.S. PATENT DOCUMENTS

| | | | |
|---|---|---|---|
| 2017/0046143 A1* | 2/2017 | Kochhar | G06F 8/60 |
| 2020/0004437 A1* | 1/2020 | Borlick | G06F 3/0619 |
| 2020/0012970 A1* | 1/2020 | Srivastava | G06N 20/00 |
| 2021/0271648 A1* | 9/2021 | Arbel | G06F 16/11 |

* cited by examiner

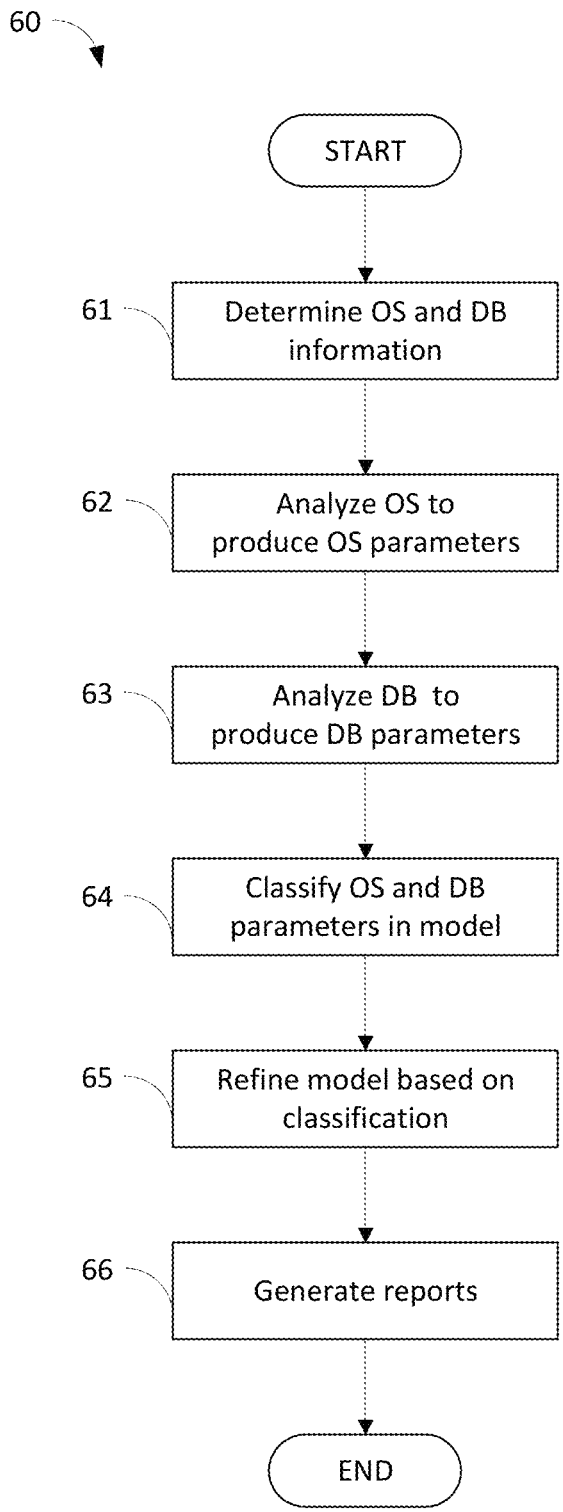

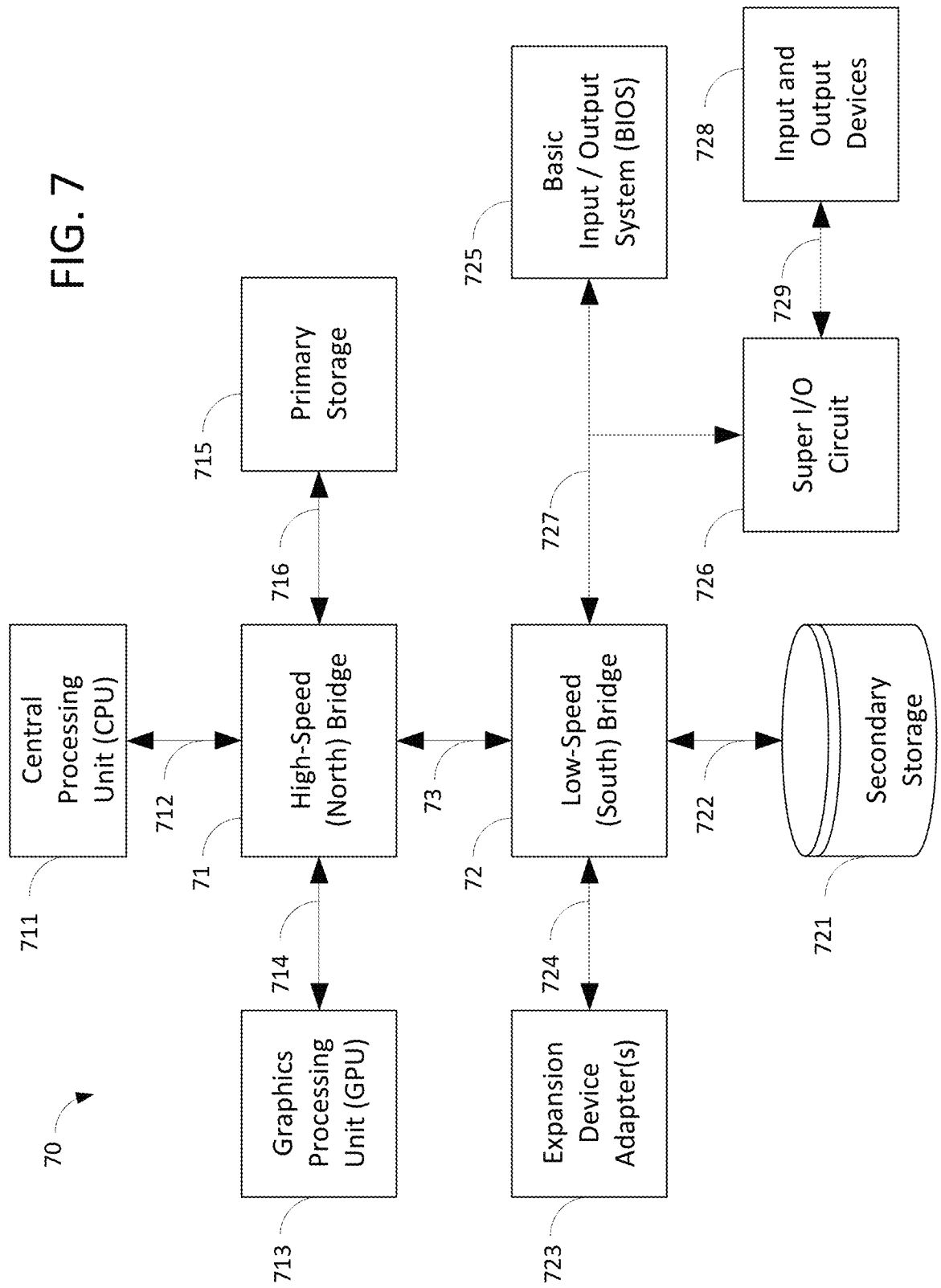

UNIFIED DATABASE TRANSITION TOOL

FIELD

The disclosure pertains generally to database transition, and more particularly to automatically coordinating workflows for database transition between multiple parties according to best practices.

BACKGROUND

Database transition is the process of transferring one or more databases from a first, pre-production data environment to a second, production data environment. In illustrative organizations, the pre-production data environment may be a software development or testing environment, while the production data environment may be visible to third parties, such as customers.

When databases are transitioned, there exist both technical and procedural issues. Technical issues pertain to transforming the data in the databases, for example as described in U.S. Pat. No. 9,811,527 entitled "Methods and Apparatus for Database Migration". By contrast, procedural issues pertain, for example, to sequencing the handoff of databases between different personnel according to workflows, so that administrative functions like database configuration or maintenance are always allocated to a clearly-defined individual or group within an organization. While various industry groups have developed best practices for coordinating workflows, it is challenging to actually implement those practices in a uniform manner in the presence of multiple database platforms, as might be found in mature organizations. Having a non-standardized process for each platform causes losses on delivery (i.e. deployment) time, among other issues, which can negatively impact the organization's smooth operation.

SUMMARY OF DISCLOSED EMBODIMENTS

Embodiments of the concepts, techniques, and structures disclosed herein include a tool providing a standardized and organized workflow that helps everyone involved in a database transition to fully understand each technical and administrative step of the process, and to reduce mistakes, errors, and problems that may occur. These individuals illustratively include project managers, database administrators (DBAs), and managers. Various embodiments include a tool that facilitates communication between these individuals, thereby reducing delays and miscommunications. Embodiments also increase reliability of the transition processes across multiple database technologies (e.g. Oracle, SQL Server, MongoDB, Elastic Search, Cassandra, PostgreSQL, Redis and Neo4J) that may be present in a single project.

Illustrative embodiments simplify handoffs by providing a centralized tool having an application programming interface (API) that genericizes underlying database technologies and transition functions, allowing database administrators to avoid reliance on knowledge of the intricacies of different database platforms. The tool is designed to apply mandatory standards for a new environment before a project's databases become visible to third parties (e.g. customers).

Thus, a first embodiment is a method of transitioning a database from a pre-production environment to a production environment. The method is performed in response to receiving commands from each of a plurality of users, by a transition management processor comprising hardware. The method includes retrieving, from a data storage repository according to a best practices workflow, a sequence of processes that implement each received command. The method next includes, for each process in the retrieved sequence, configuring a database analysis module according to whether the command pertains to the pre-production environment or the production environment, then executing the process using the database analysis module to produce a report. The method concludes by transmitting, to the commanding user, a response based on the produced reports.

Some embodiments include the transition management processor storing the produced reports in the data storage repository.

In some embodiments, the plurality of users includes a first database administrator (DBA), and a first sequence of the processes comprises automatically: predicting common transition errors, auditing compliance of data in the database in accordance with the production environment, and validating a maintenance plan.

In some embodiments, the common transition errors include data connection errors, or insufficient disk space errors, or invalid database indexes, or database users having improper data access permissions, or data lookup performance errors, or unused data errors, or improper database software patching errors, or any combination thereof.

In some embodiments, a second sequence of the processes comprises repeatedly requesting manual review by a second DBA of the reports of the predicting, auditing and validating processes, until the second DBA either approves or rejects each such process.

In some embodiments, repeatedly requesting comprises transmitting one or more emails to the second DBA, to a manager of the second DBA, or both.

In some embodiments, a third sequence of the processes comprises, after the second DBA approves the predicting, auditing, and validating processes, transmitting a stabilization period beginning email to the first DBA.

In some embodiments, a fourth sequence of the database analysis processes comprises, waiting a fixed duration after transmitting the stabilization period beginning email, then transmitting a stabilization period ending email to the first DBA and to the second DBA.

In some embodiments, predicting the common transition errors is performed by a machine learning module.

In some embodiments, the machine learning module operates by determining information about the database and an operating system in the pre-production environment using which the database is executing.

In some embodiments, the machine learning module further operates by performing an automated analysis of the operating system to compute operating system parameters.

In some embodiments, the machine learning module further operates by performing an automated analysis of the database to compute database parameters.

In some embodiments, the machine learning module further operates by classifying the operating system parameters and the database parameters according to a model for predicting the common transition errors.

In some embodiments, the machine learning module further operates by training the model according to the classification.

In some embodiments, the machine learning module further operates by generating reports, based on the classification, of a transition failure prediction, of potential problems caused by the common issues, and of the first computing environment.

In some embodiments, the machine learning module further operates by transmitting the generated reports to the first DBA.

It is appreciated that the concepts and techniques disclosed herein may be embodied in non-transitorily stored computer program code that, when executed by a transition management processor, performs any of the above-described methods.

Another embodiment is a system for transitioning a database from a pre-production environment into a production environment. The system includes a plurality of modules, each for performing a respective process. The system also includes a data storage repository for storing associations between each of a plurality of commands and a corresponding plurality of configurable sequences of the processes that implement the command. The system further includes a transition management processor comprising hardware.

The transition management processor performs various functions in response to receiving a command from a user. These functions include first retrieving, from the data storage repository according to a best practices workflow, the sequence of processes that implement the received command. The functions next include, for each process in the retrieved sequence, configuring the respective module in the plurality of modules according to whether the command pertains to the pre-production environment or the production environment, then executing the process using the respective module to produce a report. The functions further include transmitting, to the user, a response based on the produced reports.

In some embodiments, the data storage repository comprises a database.

In some embodiments, the plurality of modules includes a module that predicts common transition failures according to a machine learning model.

DESCRIPTION OF THE SEVERAL VIEWS OF THE DRAWINGS

The manner and process of making and using the disclosed embodiments may be appreciated by reference to the drawings, in which:

FIG. 6 shows a flowchart for machine learning in accordance with an embodiment; and FIG. 7 schematically shows relevant components of a computer that may be used in accordance with an embodiment.

DETAILED DESCRIPTION

Figure 1:
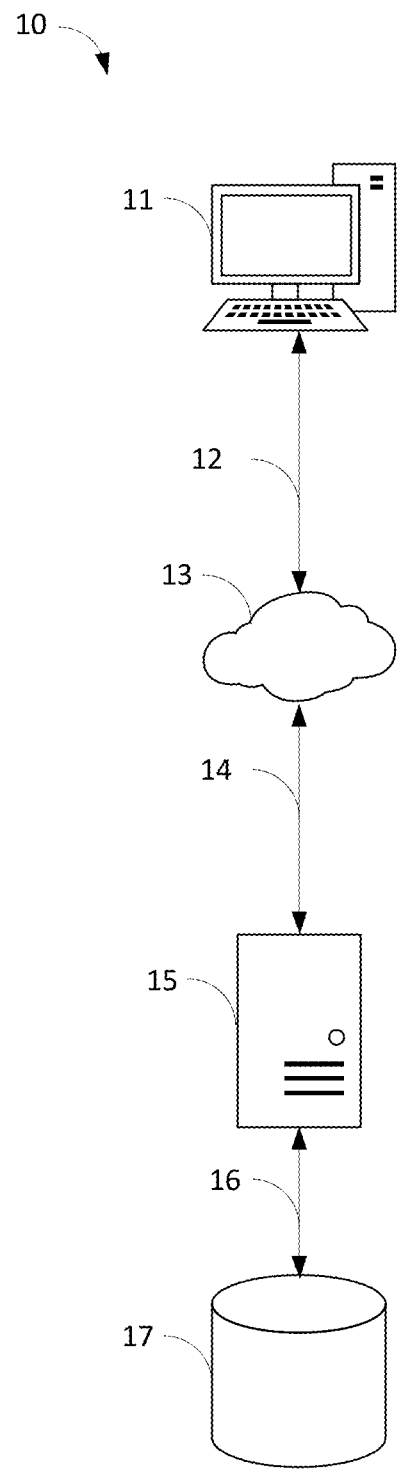
FIG. 1 schematically shows a typical client-server system in which the disclosed concepts, structures, and techniques may be advantageously embodied.

FIG. 1 schematically shows a typical client-server system in which the disclosed concepts, structures, and techniques may be advantageously embodied. In accordance with client-server principles, the system 10 includes at least one client device coupled for bidirectional data communication with at least one server device using a data network. Generally, the client requests, via the data network, that the server perform a computation or other function, and the server responsively fulfills the request, optionally returning a result or status indicator to the client via the data network.

Thus, the system 10 includes a client device 11. The client device 11 is illustrated as a desktop computer, but may be any electronic device known in the art, including without limitation a laptop computer, tablet computer, smartphone, embedded system, or any other device capable of transmitting and receiving data, and requesting that another electronic device perform a computation.

The client device 11 is coupled, via a data link 12, to a data network 13. The data link 12 is any combination of hardware or software suited for communicating data between the client device 11 and other electronic devices via the data network 13. The data link 12 may be, for example, a wired Ethernet link based on the Institute of Electrical and Electronics Engineers ("IEEE") 802.3 family of standards, a wireless radio link based on the IEEE 802.11 family of standards ("Wi-Fi"), or any other data connection.

The data network 13 is any combination of hardware or software suited for communicating data between electronic devices via data links. The data network 13 may be, for example, a local area network ("LAN"), a wide area network ("WAN"), a metropolitan area network ("MAN"), a virtual private network ("VPN"), the Internet, or any other type of data network.

It is appreciated that a data network 13 operates to mediate data communication between multiple electronic devices. Thus, the depiction of only a single client device 11 in FIG. 1 is merely illustrative, and a typical system 10 may have any number of client devices coupled for data communication using corresponding data links to the data network 13. It is also appreciated that the data network 13 may be operated by any number of autonomous entities, and thus may be a conglomeration of smaller networks that exchange data according to standardized protocols and data formats, including without limitation the Internet Protocol ("IP") specified by Internet Standard STD 5, the User Datagram Protocol ("UDP") specified by Internet Standard STD 6, and the Transmission Control Protocol ("TCP") specified by Internet Standard STD 7, among others.

The data network 13 allows the client device 11 to communicate with a server device 15, which is coupled to the data network 13 using a data link 14. The data link 14 is any combination of hardware or software suited for communicating data between the server device 15 and other electronic devices via the data network 13. The server device 15 may be any electronic device known in the art that is capable of transmitting and receiving data, and performing a computation on behalf of another electronic device.

Again, the data network 13 operates to mediate data communication between multiple electronic devices. Thus, the depiction of only a single server device 15 in FIG. 1 is merely illustrative, and a typical system 10 may have any number of server devices coupled for data communication using corresponding data links to the data network 13. In particular, to provide simultaneous service to large numbers of client devices, a particular computation (or type of computation, such as rendering a web page) may be allocated to one of multiple server devices using a load balancer or other device. It is further appreciated that the server device 15, along with additional server devices if required, may provide well-defined operations known as "services"

according to a service-oriented architecture ("SOA"), as those terms are known in the art.

It is appreciated in accordance with client-server principles that the designation of device 11 as the "client device" and device 15 as the "server device" is arbitrary, as most electronic devices that are capable of transmitting and receiving data can perform computations on behalf of other electronic devices upon receipt of data, so requesting, according to a mutually agreed protocol. Thus, the designation of "client device" and "server device" is made herein with regard to an intended mode of operation of the system 10, namely that the client device 11 is the device requesting that a particular computation be performed on behalf of a user thereof, and that the server device 15 operates a "service" to perform the computation and communicate the results to the client device 11. A typical protocol for such interaction is the Hypertext Transfer Protocol ("HTTP" or "HTTP/1.1") specified as a proposed Internet Standard by Requests for Comment ("RFC") 7230 through 7235, which is used to implement the World Wide Web.

FIG. 1 shows the server device 15 coupled, via a storage link 16, to a data storage device 17. The data storage device 17 may be a database, file system, volatile or non-volatile memory, network attached storage ("NAS"), storage area network ("SAN"), or any other hardware or software that is capable of storing data used by a server device 15 or a service executing thereon. The storage link 16 may be any hardware or software capable of communicating data between the server device 15 and the data storage device 17. It is appreciated that, where more than one server device 15 is present, multiple server devices may communicate with the same data storage device 17 to provide data sharing between the server devices.

It is appreciated that a requested computation may be done in several parts, thereby requiring the system 10 to retain an intermediate computational state between requests. If the services provided by the server device 15 do not store any such state (for example, to simplify their design), then the client device 11 must supply all state with each request. This type of communication may be provided using the representational state transfer ("REST") client-server architecture. In addition to being a stateless client-server architecture, REST systems permit responses to requests with identical inputs to be cached to improve response time; permit layering of services, thereby multiplying available functionality; permit services to require clients to perform some computation locally to improve performance; and provide a uniform interface for all client devices.

Figure 2:
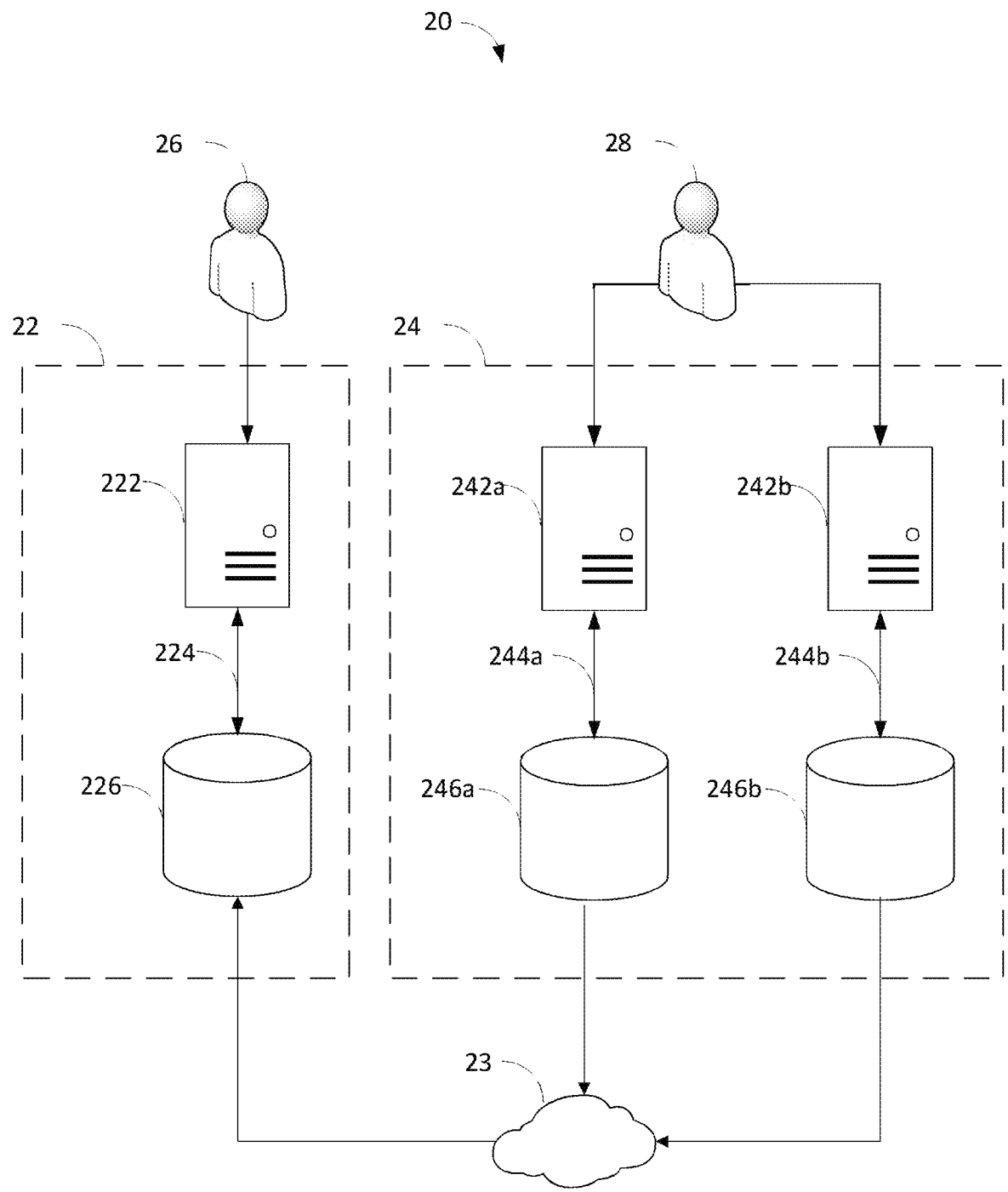
FIG. 2 schematically shows a system having a production environment and a pre-production environment.

FIG. 2 schematically shows a system 20 having a production environment 22 and a pre-production environment 24. The production environment 22 is operated and maintained by one or more individuals 26, while the pre-production environment 24 is operated and maintained by one or more individuals 28. Any of the individuals 26, 28 may be, for example, a system administrator, a database administrator, a project administrator, a computer programmer, or other individual known in the art of computer system management.

The production environment 22 illustratively provides computer services to third-party clients. Thus, the production environment 22 includes a server device 222 for providing these services, coupled via a storage link 224 to a data storage device 226 that provides a database. The server device 222, the storage link 224, and the data storage device 226 may be, respectively, the server device 15, the storage link 16, and the data storage device 17 of FIG. 1. It is appreciated that a production environment 22 may include many servers, storage links, and data storage devices, and that FIG. 2 is merely illustrative in this regard.

The existence of a separate pre-production environment 24 permits an organization to update and test software versions having greater optimizations. Thus, the pre-production environment 24 may include multiple server devices 242a and 242b, coupled via storage links 242a and 242b to respective data storage devices 246a and 246b that provide databases. It is appreciated that a pre-production environment 24 may include more or fewer servers, storage links, and data storage devices, and that FIG. 2 is merely illustrative in this regard. It is also appreciated that multiple servers in the pre-production environment 24 may be coupled to a single data storage device.

Illustratively, the databases provided by the data storage devices 246a and 246b may use different database technology; that is, one of the databases may be provided by Oracle Corporation of Redwood City, Calif. while another one of the databases may be provided by MongoDB Inc. of New York, N.Y. or by the PostgreSQL Global Development Group. As is well known in the art of databases, each different database technology or platform is provided with different tools for accomplishing the same or similar functions relating to database creation, user account creation and maintenance, data access security, database compliance auditing, and database transition, among other functions.

The data storage device 226 may be coupled by a data network 23 to receive data from the data storage devices 246a, 246b, and in particular to transmit data relating to database transition from the latter data storage devices to the former. The data network 23 illustratively is a private data network that, for reasons of security, is accessible only to the organization providing the environments 22 and 24, and is inaccessible to third parties who receive services using the production environment 22. It is appreciated that other physical means may be used to transmit data within databases from a pre-production environment 24 to a production environment 22, and that FIG. 2 is merely illustrative in this regard.

In some alternate embodiments, however, one of the data storage devices (say, device 246a) provides database functionality that replaces corresponding functionality in the data storage device 226 after the transition. That is, the data storage device 246a transitions into the production environment 22, and the server device 222 becomes coupled via the storage link 224 to the data storage device 246a rather than to the data storage device 226. In these embodiments, the data storage device 226 may be retired from the production environment 22 if it no longer hosts data used by any server device in the production environment 22. Moreover, various permissions (e.g. access permissions) in the data storage device 246a and any database it hosts must be altered to provide visibility to third parties (i.e. customers).

In an inappropriate transition or transition process between such environments, several common technical errors may occur. Some of these errors are serious enough to block the production database from running, while others may cause severe performance problems. A few of the errors that may happen are the following. Firstly, errors in measuring available disk space in the data storage device 226 may result in databases with inappropriate size or growth potential for what the application requires. Next, errors with outdated software patches or even missing patches may cause security flaws and failures, performance not reaching the expected, and an outdated system in a general.

Another common error results from altering a database to conform with restrictions on a production environment 22

(e.g. altering the name of a pre-production database or its security access information) may cause connection errors between an application executing on the server 222 and the database, or may result in database partitions or users lacking proper access permissions.

Also, renaming identifiers within a database schema to conform to the production environment may result in the production database having one or more invalid indexes or keys that are used to improve the speed of data retrieval operations, generating a deficient performance on the database or even causing functions on the application to not work properly. This is especially true for foreign keys in databases using a relational database management system (RDBMS).

Stale database tables (i.e. tables that are not in use in the production environment, such as those used for debugging the software) may cause an unnecessary reduction of disk space available for use by the database, and unnecessary monitoring overhead within the database itself. Database objects (such as tables, views, sequences, and indexes) may become invalid on transition, resulting in a negative impact on performance. Likewise, data may be lost or corrupted during transition, preventing application function or reducing performance.

Figure 3:
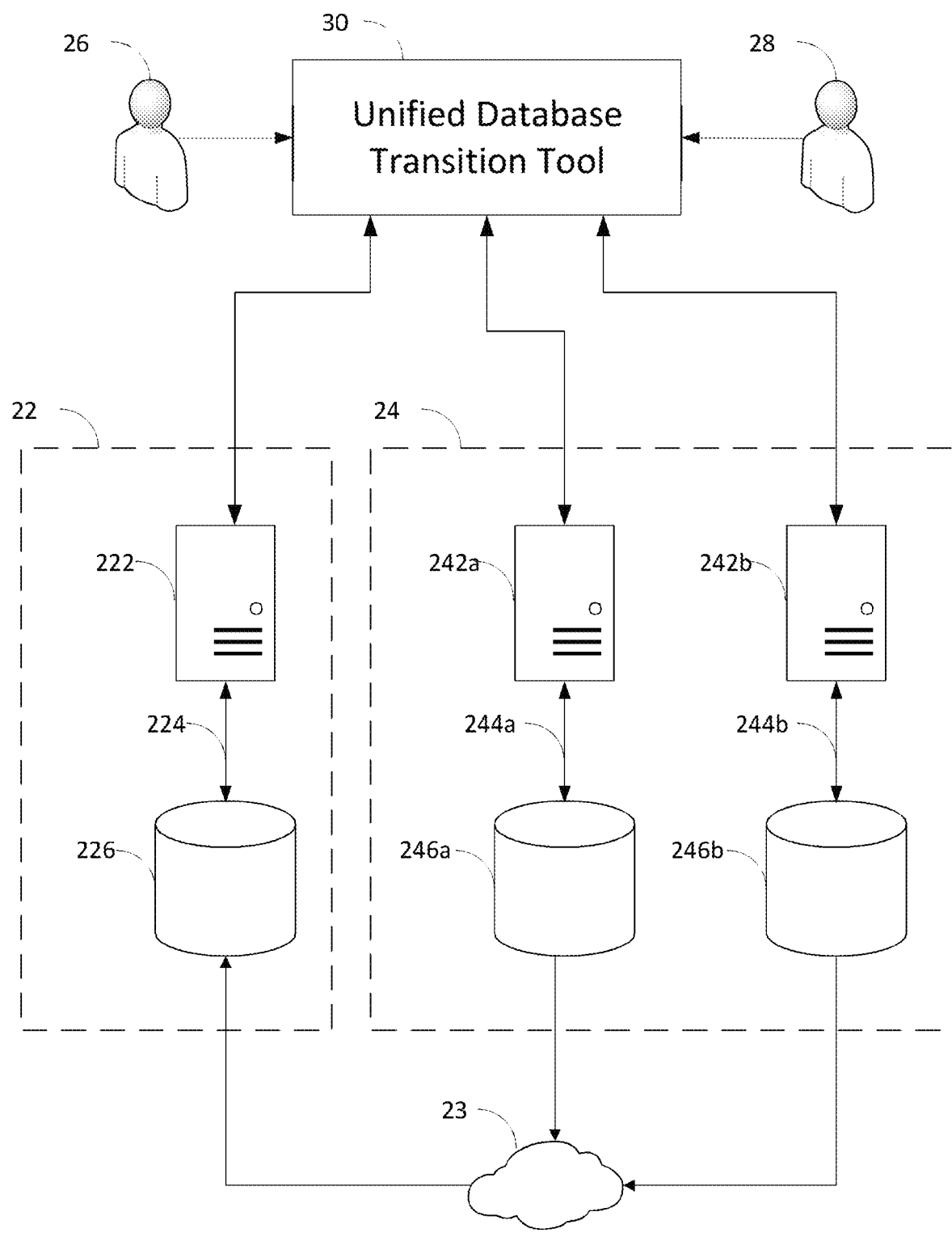
FIG. 3 schematically shows the system of FIG. 2, modified in accordance with an embodiment to include a unified database transition tool system.

FIG. 3 schematically shows the database management system of FIG. 2, modified to include a unified database transition tool (UDTT) 30 according to an embodiment. By providing a single, centralized, standardized tool for organizing the transition process according to best practices, errors like the ones presented above advantageously may be avoided, thereby improving the transition process within the organization. Thus, new production databases are created with the appropriate engineering requirements according to a standardized process for doing so.

In accordance with the modified system of FIG. 3, the UDTT 30 replaces direct interaction between each of individuals 26, 28 with the production and pre-production environments 22, 24. Therefore, as indicated above, the transition workflow within the organization is altered and improved, as the individuals 26, 28 work directly with the UDTT 30 to coordinate their actions with respect to completing the many functional processes of transitioning databases. The UDTT 30 itself optionally may perform those functional processes itself, or it may delegate those processes to other systems known in the art for performing them.

Figure 4:
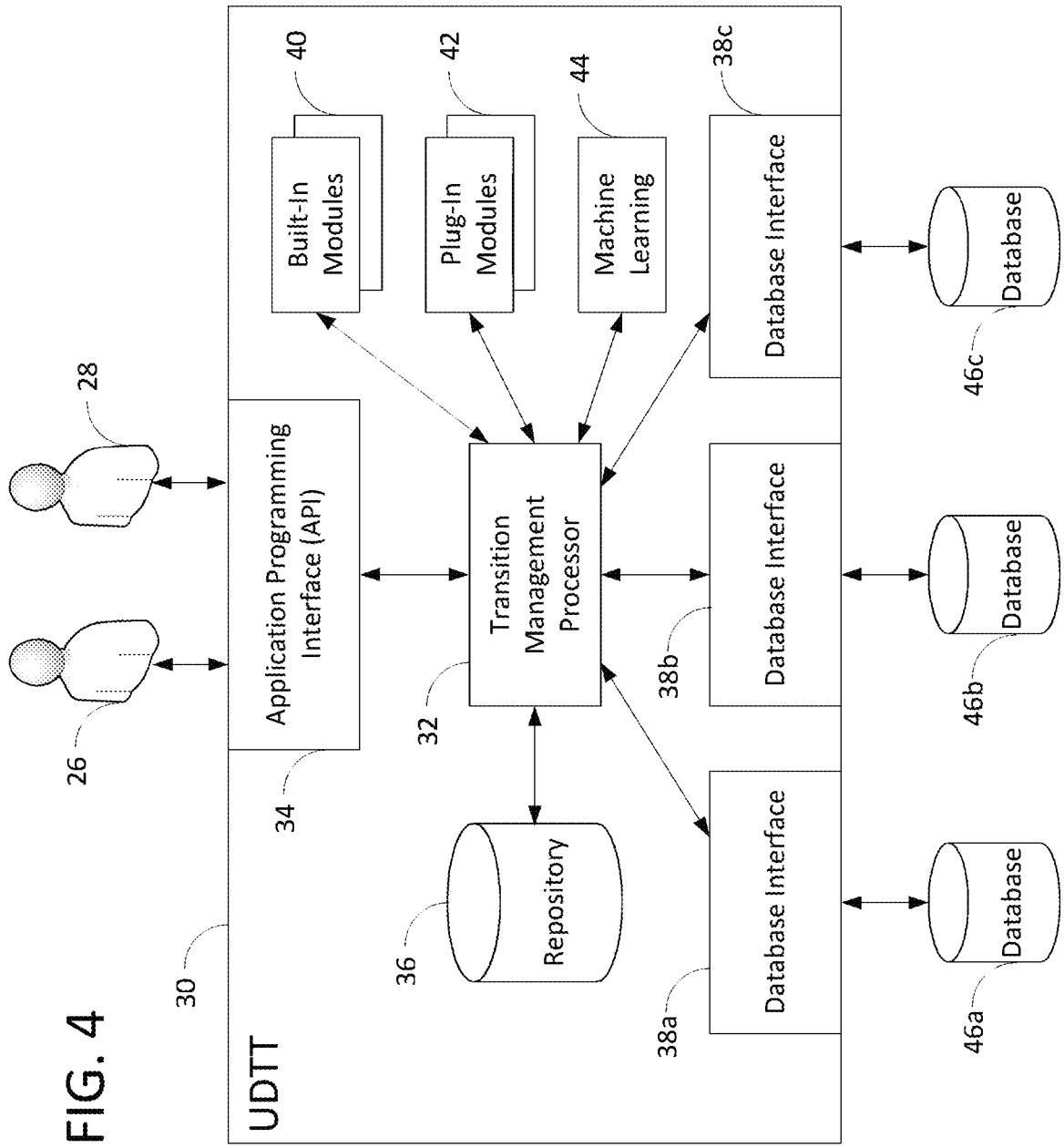
FIG. 4 schematically shows a unified database transition tool system in accordance with an embodiment.

FIG. 4 schematically shows relevant functional components in a unified database transition tool (UDTT) embodiment 30. FIG. 4 provides details of the UDTT 30 of FIG. 3, while omitting some other details found in FIG. 3. Thus, as relevant in FIG. 4 are shown three databases 46a, 46b, and 46c. These databases may be implemented, for example, on data storage devices 226, 246a, and 246b of FIG. 3, and may be provided using any variety of different or same database technologies.

The UDTT 30 includes a transition management processor (TMP) 32. The TMP 32 may be made of any hardware, or combination thereof with firmware and/or software, and may comprise, for example, a computer CPU or embedded system. The TMP 32 executes commands that coordinate the process of transitioning databases from one computer environment to another according to best practices for doing so. By centralizing the execution of commands, the TMP 32 only allows transition of databases according to a controlled and standardized workflow, thereby preventing miscommunications between the individuals 26, 28 involved in the transition that might result in the common errors described above.

The UDTT 30 also includes an application programming interface (API) 34. The API 34 provides an interface between the UDTT 30 and the individuals 26, 28 who are responsible for transitioning the databases. The API 34 receives commands from these individuals 26, 28 to access the functions and structures of the UDTT 30, described below in more detail, provides those commands to the TMP 32 for execution, then provides responses from the TMP 32 to the individuals 26, 28 according to the command. The API 34 may be implemented using techniques known in the art for doing so.

The UDTT 30 also has a data storage repository 36, sometimes called herein an instruction repository, for storing instructions that relate to various processes or functions that the UDTT 30 performs. Such processes relate to providing a proper workflow according to best practices, and the instructions accordingly may be modified by an organization as those practices change, or to be tailored to the organization's business needs. The repository 36 may be implemented as any database known in the art, for example using a MongoDB database. It is appreciated that the repository 36 itself is not a database that is transitioned from one computer environment to another, but rather is used for data storage and retrieval purposes adjunct to the transition process. Thus, particular implementation of the repository 36 should not be viewed as limiting the design or implementation of a UDTT 30.

The TMP 32 implements various commands it receives from the individuals 26, 28 by referring to the instructions for implementing those commands stored in the repository 36. As those instructions advantageously implement best practices of both the industry and the organization, by executing them the TMP 32 (and by extension, the UDTT 30) standardizes the workflow for transitioning databases regardless of their underlying technological platform and in accordance with the desires of all of the relevant stakeholders in the organization.

The UDTT 30 further includes multiple modules for performing technical transition processes (as contrasted with the workflow management processes) required for transitioning databases. These modules include database interfaces 38a, 38b, 38c for communicating directly with the databases 46a, 46b, 46c, which may be provided by the respective database vendors or by third parties in connection with a programming language (e.g. the "java.sql" interfaces provided as part of the Java language provided by Oracle). The modules also include various built-in modules 40, plug-in modules 42, and a machine learning module 44.

The TMP 32 executes each technical transition process using one of the modules specified by an instruction in the repository 36, configuring each module according to whether the command that triggered the instruction pertains to the pre-production environment, the production environment, or both. Each such process, when complete, generates a report, and this report (or a summary report) is then transmitted back to the individual 26, 28 who issued the command, for example as a web page showing the results of the command.

The built-in modules 40 include a variety of hardware or software components for performing creation, management, or transition functions that are common to all databases supported by the UDTT 30. For example, the built-in modules 40 may include a security module for checking the user and partition security and permissions throughout the database. The built-in modules 40 also may include an auditing module for checking the compliance of a database and its operating system with the environment in which it is meant to be deployed. The auditing module may perform compliance checking using a series of tests provided as functions stored within the repository 36, which may be updated by an organization to reflect its business requirements. The built-in modules 40 may further include a database name checking module for determining whether a desired database name is already used in the target environment and if so, for suggesting alternate names that might be used in compliance with the target environment's configuration and namespace restrictions. It is appreciated that the built-in modules 40 may include other modules of general applicability to database transition, and that embodiments are not necessarily limited to the above-described built-in modules 40.

The plug-in modules 42 include a variety of hardware or software components for performing creation, management, or transition functions that are provided by third parties, such as database vendors, in a platform-specific way. The plug-in modules 42 provide extensibility of the UDTT 30, allowing it to perform functions not provided or developed by the organization. Such modules may perform standard functions with respect to the database platforms supported by the UDTT 30, such as security scans and data integrity scans, and may be complimentary to functions performed by the built-in modules 40.

The machine learning module 44 provides artificial intelligence (AI) functions for the UDTT 30. In particular, the machine learning module 44 analyzes the source and target computer environments, extracts parameters from them, and classifies those parameters according to a model to predict possible errors that might occur in the operating system and database during the transition. The operation of the machine learning module 44 is described in greater detail below in connection with FIG. 6.

Figure 5:
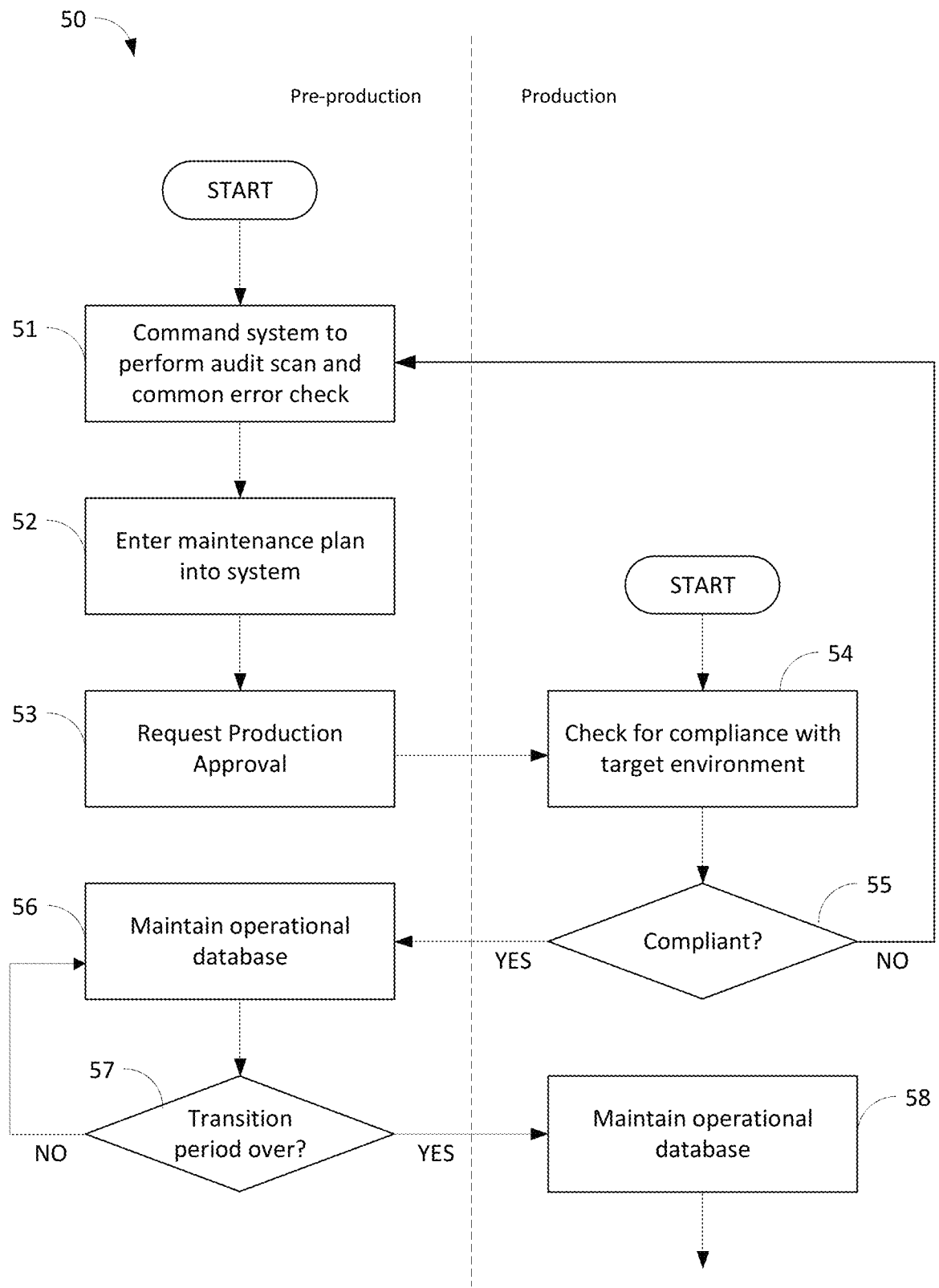
FIG. 5 shows a flowchart for a method of transitioning a database from a pre-production environment to a production environment.

Having described above a unified database transition tool, or UDTT 30, for transitioning a database from a first, pre-production computer environment to a second, production computer environment according to a standardized workflow, FIG. 5 shows a flowchart for a method 50 of performing the actual database handoff. It is presumed that all of the technical operations to convert the data in the database to the target environment already have been performed, and what remains is to ensure an orderly transition of responsibility over the database from pre-production staff to operational or production staff.

As might be expected from the nature of database transition, the method has processes that are performed both in a first, pre-production perspective and in a second, production perspective, as indicated by the two sides of the dashed line. Some of the processes in the method 50 are performed automatically, while other processes are performed by individuals. It is thus appreciated that the method 50 enables people and computers to combine different processes in a novel, synergistic manner to complete the method 50.

The method 50 begins in a process 51, in which a user commands a computer system, such as UDTT 30, to perform a standardized checklist of transition tasks, including an audit scan and common error check. In various embodiments, the user is a first, pre-production database administrator (DBA). The system then automatically performs the audit scan using the auditing module described above, and the common error check using the machine learning module described below in connection with FIG. 6. Illustratively, the audit scan and common error check both produce a report, respectively an audit results report and a common errors report predicting common errors. In various embodiments, these reports are stored in a data storage repository, or other data storage device.

The method 50 continues in a process 52, in which the user enters a maintenance plan for the transitioned database into the system. The maintenance plan describes the responsibilities of DBAs.

The method 50 continues with a process 53, in which the first DBA user requests approval to hand off the pre-production database to a second user, who also may be a DBA in various embodiments. The process 53 may include the system repeatedly and automatically requesting that the second user manually review the database reports and maintenance plan until the second user either approves or rejects each such item. Illustratively, requesting manual review may mean transmitting one or more emails to the second user, e.g. one email each day. If the second user fails to respond to the emails in a timely manner, e.g. after three days, the process 53 may further include sending an email to the second user's manager within the organization, and so on. In this way, the process 53 automatically complements and enables manual processes performed by individuals to create a holistic method 50.

In response to the requests performed in process 53, in a checking process 54 the production user manually checks the generated reports for compliance with the target (i.e., production) environment. The checking process 54 requires intervention to invoke the knowledge and expertise of the second user with respect to the production environment. For example, process 54 may include the production user executing the same, standardized checklist that the pre-production user executed in the process 51, but utilizing the former's expertise regarding items requiring especially delicate configuration.

In decision process 55, the production user determines whether the transitioned database is compliant and acceptable for deployment into the production environment. If the database is not compliant, then the production user commands the system that the database transition is non-compliant. In response, the system workflow returns to process 51, and the system notifies the first, pre-production user of the compliance failure. Notification may take the form of one or more emails, informing the first user of the denial and of the reasons why the database was not compliant. Repeated notifications may be sent by email, as described above in connection with process 53, until the first user again performs process 51 in accordance with the reasons stated in the denial, and the method 50 loops.

However, if the production user determines that the database is compliant with the target, production environment, then the production user command the system that the database transition is compliant. In response, the system workflow proceeds to a process 56, in which the database is deployed in the production environment, but the DBA user maintains the operational database during a stabilization period, such as two weeks, to ensure that any applications using the transitioned database function properly. Process 56 includes notifying the DBA user of this outcome by the system automatically transmitting a stabilization period beginning email to that user. The process 56 also includes the DBA user maintaining the database, e.g. using techniques known in the art, during which time the production user can become familiar with the database and prepare to take over ongoing maintenance.

The method 50 continues to a process 57 where the system determines whether the transition or stabilization period has elapsed successfully. If not, the method 50 returns to process 56, and the pre-production maintenance process continues. If the stabilization period has elapsed successfully, then the method proceeds to a final process 58, in which the second, production user maintains the transitioned database on an ongoing, permanent basis and the transition is complete. The process 58 may include, for example, transmitting a stabilization period ending email to both the DBA users indicating the shift in responsibility over the database. At this time, the database can be considered "in production".

In various embodiments, the transition system that performs the method 50 (e.g. the UDTT 30 of FIG. 4) may provide a dashboard website permitting the DBA users and others (e.g. project managers or other supervisors) to obtain a visualization of the process, and where within the method 50 a given handoff is currently situated. Using this dashboard, project managers would avoid the need to mandatorily get in touch with the DBAs to know in which step the process is. Also, the dashboard optionally may allow the project managers to mark themselves for receiving the notifications that occur in the above-described processes, avoiding the need to check the dashboard every day. In this way, the dashboard would guarantee a higher movement of information and a higher awareness of the process between DBAs and the application teams, avoiding delays and miscommunications among them.

As discussed above in connection with FIGS. 4 and 5, a database transition tool, such as UDTT 30, may facilitate the handoff or transition of a database from a first environment to a second environment. As part of that handoff, checks for some common transitions errors are performed on the transitioned database to determine whether or not additional, technical corrections need to be made. Such corrections may include, for example, adjusting database connection parameters, user or partition permissions (e.g. passwords and internal access rights), database names, table names, column names, deleting stale databases, and so on. As databases may be arranged in an infinite variety of configurations, it is not possible to detect all such errors according to a general algorithm. However, in accordance with embodiments disclosed herein, the UDTT 30 includes a machine learning module 44 that can predict whether such errors might be present, by comparing parameters of the present transition to past transitions and developing a computed heuristic.

Thus, FIG. 6 shows a flowchart of a method 60 for machine learning in accordance with an embodiment of the concepts, techniques, and structures disclosed herein. The method 60 produces reports relating to several transition-related items that may be reviewed by a DBA in either the pre-production or production environments before making the database live.

The method 60 begins with a process 61, in which the machine learning module determines operating system (OS) and database (DB) information. In some embodiments, operating system information includes the name of the OS (e.g. Linux or Microsoft Windows), a build revision number, an underlying hardware architecture (e.g. whether the CPU was manufactured by Intel Corporation or Advanced Micro Devices), and a list of any OS updates or patches that were installed. Likewise, database information may include the name of the database platform (e.g. Oracle, NoSQL, PostgreSQL, MongoDB, and so on), a build revision number, and a list of DB updates or patches that were installed.

The method 60 continues with a process 62, in which the OS is analyzed to produce OS parameters. The process 62 may select a particular analysis program or configuration from several such functions according to the OS information. That is, various files to be analyzed may be located in different files or directories depending on the OS, and the programs to perform the analyses themselves may be embodied in different binaries having different formats depending on the OS. Analysis may include, for example, deriving statistics and other parameters from log files, stored by the OS that relate to the transitioned database, such as error logs. Such statistics may include, for example a count or frequency of events, warnings, or errors. Analysis also may include deriving statistics from program code instrumentation or telemetry logs, or similar sources. The process 62 produces as output a dataset of parameters relating to operating system and application execution.

The method 60 continues with a process 63, in which the database is likewise analyzed to produce DB parameters. The process 63 may generate statistics and other parameters from database alert logs and a log of the availability (i.e. uptime percentage) history. The process 63 also may automatically determine, using techniques known in the art, whether there exist any bug reports related to the DB information obtained in process 61 (e.g. the DB name and the list of updates and patches). The process 63 produces as output a dataset of parameters relating to the database execution.

The method 60 then moves to a process 64 that classifies the OS and DB parameters according to a machine learning model. The classification indicates whether common transition errors will likely be present as a function of the OS and DB parameters with a parameter space. The model may be any machine learning model known in the art, such as an artificial neural network, a decision tree, a Bayesian network, or a genetic algorithm, among others. The model may be trained according to known techniques for training such models; these techniques are as varied as the models themselves, but will be known to a person having ordinary skill in the art. Such a person should also understand how to choose an appropriate model.

The method 60 continues with a process 65 that refines the machine learning model based on the classification. That is, depending on the classification, various parameters and weights within the model itself may be refined according to a training algorithm. The types of training themselves are widely varied, and include supervised learning, unsupervised learning, reinforcement learning, self-learning, and may others. It is appreciated that a person having ordinary skill in the art will understand which training algorithm is most appropriate to the particular model chosen. The process 65 concludes by updating the training dataset and the model parameters.

The method 60 concludes with a process 66 that generates one or more reports, based on the classification. These reports may indicate a transition failure prediction, potential problems caused by the common issues, and detailed parameters relating to the first computing environment, among other reports. The process 66 may then provide these reports via an API (e.g. API 34 of the UDTT 30) in response to a command issued by an individual (e.g. individual 26 or 28), and save them for later viewing via a dashboard (e.g. as described above in connection with FIG. 5).

FIG. 7 schematically shows relevant physical components of a computer processing system 70 embodiment of the concepts, structures, and techniques disclosed herein. Generally, the computer 70 has many functional components that communicate data with each other using data buses. The functional components of FIG. 7 are physically arranged based on the speed at which each must operate, and the technology used to communicate data using buses at the necessary speeds to permit such operation.

Thus, the computer 70 is arranged as high-speed components and buses 711 to 716 and low-speed components and buses 721 to 729. The high-speed components and buses 711 to 716 are coupled for data communication using a high-speed bridge 71, also called a "northbridge," while the low-speed components and buses 721 to 729 are coupled using a low-speed bridge 72, also called a "southbridge."

The computer 70 includes a central processing unit ("CPU") 711 coupled to the high-speed bridge 71 via a bus 712. The CPU 711 is electronic circuitry that carries out the instructions of a computer program. As is known in the art, the CPU 711 may be implemented as a microprocessor; that is, as an integrated circuit ("IC"; also called a "chip" or "microchip"). In some embodiments, the CPU 711 may be implemented as a microcontroller for embedded applications, or according to other embodiments known in the art.

The bus 712 may be implemented using any technology known in the art for interconnection of CPUs (or more particularly, of microprocessors). For example, the bus 712 may be implemented using the HyperTransport architecture developed initially by AMD, the Intel QuickPath Interconnect ("QPI"), or a similar technology. In some embodiments, the functions of the high-speed bridge 71 may be implemented in whole or in part by the CPU 711, obviating the need for the bus 712.

The computer 70 includes one or more graphics processing units (GPUs) 713 coupled to the high-speed bridge 71 via a graphics bus 714. Each GPU 713 is designed to process commands from the CPU 711 into image data for display on a display screen (not shown). In some embodiments, the CPU 711 performs graphics processing directly, obviating the need for a separate GPU 713 and graphics bus 714. In other embodiments, a GPU 713 is physically embodied as an integrated circuit separate from the CPU 711 and may be physically detachable from the computer 70 if embodied on an expansion card, such as a video card. The GPU 713 may store image data (or other data, if the GPU 713 is used as an auxiliary computing processor) in a graphics buffer.

The graphics bus 714 may be implemented using any technology known in the art for data communication between a CPU and a GPU. For example, the graphics bus 714 may be implemented using the Peripheral Component Interconnect Express ("PCI Express" or "PCIe") standard, or a similar technology.

The computer 70 includes a primary storage 715 coupled to the high-speed bridge 71 via a memory bus 716. The primary storage 715, which may be called "main memory" or simply "memory" herein, includes computer program instructions, data, or both, for use by the CPU 711. The primary storage 715 may include random-access memory ("RAM"). RAM is "volatile" if its data are lost when power is removed, and "non-volatile" if its data are retained without applied power. Typically, volatile RAM is used when the computer 70 is "awake" and executing a program, and when the computer 70 is temporarily "asleep", while non-volatile RAM ("NVRAM") is used when the computer 70 is "hibernating"; however, embodiments may vary. Volatile RAM may be, for example, dynamic ("DRAM"), synchronous ("SDRAM"), and double-data rate ("DDR SDRAM"). Non-volatile RAM may be, for example, solid-state flash memory. RAM may be physically provided as one or more dual in-line memory modules ("DIMMs"), or other, similar technology known in the art.

The memory bus 716 may be implemented using any technology known in the art for data communication between a CPU and a primary storage. The memory bus 716 may comprise an address bus for electrically indicating a storage address, and a data bus for transmitting program instructions and data to, and receiving them from, the primary storage 715. For example, if data are stored and retrieved 64 bits (eight bytes) at a time, then the data bus has a width of 64 bits. Continuing this example, if the address bus has a width of 32 bits, then $2^{32}$ memory addresses are accessible, so the computer 70 may use up to $8*2^{32}=32$ gigabytes (GB) of primary storage 715. In this example, the memory bus 716 will have a total width of 64+32=96 bits. The computer 70 also may include a memory controller circuit (not shown) that converts electrical signals received from the memory bus 716 to electrical signals expected by physical pins in the primary storage 715, and vice versa.

Computer memory may be hierarchically organized based on a tradeoff between memory response time and memory size, so depictions and references herein to types of memory as being in certain physical locations are for illustration only. Thus, some embodiments (e.g. embedded systems) provide the CPU 711, the graphics processing units 713, the primary storage 715, and the high-speed bridge 71, or any combination thereof, as a single integrated circuit. In such embodiments, buses 712, 714, 716 may form part of the same integrated circuit and need not be physically separate. Other designs for the computer 70 may embody the functions of the CPU 711, graphics processing units 713, and the primary storage 715 in different configurations, obviating the need for one or more of the buses 712, 714, 716.

The depiction of the high-speed bridge 71 coupled to the CPU 711, GPU 713, and primary storage 715 is merely exemplary, as other components may be coupled for communication with the high-speed bridge 71. For example, a network interface controller ("NIC" or "network adapter") may be coupled to the high-speed bridge 71, for transmitting and receiving data using a data channel. The MC may store data to be transmitted to, and received from, the data channel in a network data buffer.

The high-speed bridge 71 is coupled for data communication with the low-speed bridge 72 using an internal data bus 73. Control circuitry (not shown) may be required for transmitting and receiving data at different speeds. The internal data bus 73 may be implemented using the Intel Direct Media Interface ("DMI") or a similar technology.

The computer 70 includes a secondary storage 721 coupled to the low-speed bridge 72 via a storage bus 722. The secondary storage 721, which may be called "auxiliary memory", "auxiliary storage", or "external memory" herein, stores program instructions and data for access at relatively low speeds and over relatively long durations. Since such durations may include removal of power from the computer 70, the secondary storage 721 may include non-volatile memory (which may or may not be randomly accessible).

Non-volatile memory may comprise solid-state memory having no moving parts, for example a flash drive or solid-state drive. Alternately, non-volatile memory may comprise a moving disc or tape for storing data and an apparatus for reading (and possibly writing) the data. Data may be stored (and possibly rewritten) optically, for example on a compact disc ("CD"), digital video disc ("DVD"), or Blu-ray disc ("BD"), or magnetically, for example on a disc in a hard disk drive ("HDD") or a floppy disk, or on a digital audio tape ("DAT"). Non-volatile memory may be, for example, read-only ("ROM"), write-once read-many ("WORM"), programmable ("PROM"), erasable ("EPROM"), or electrically erasable ("EEPROM").

The storage bus 722 may be implemented using any technology known in the art for data communication between a CPU and a secondary storage and may include a host adaptor (not shown) for adapting electrical signals from the low-speed bridge 72 to a format expected by physical pins on the secondary storage 721, and vice versa. For example, the storage bus 722 may use a Universal Serial Bus ("USB") standard; a Serial AT Attachment ("SATA") standard; a Parallel AT Attachment ("PATA") standard such as Integrated Drive Electronics ("IDE"), Enhanced IDE ("EIDE"), ATA Packet Interface ("ATAPI"), or Ultra ATA; a Small Computer System Interface ("SCSI") standard; or a similar technology.

The computer 70 also includes one or more expansion device adapters 723 coupled to the low-speed bridge 72 via a respective one or more expansion buses 724. Each expansion device adapter 723 permits the computer 70 to communicate with expansion devices (not shown) that provide additional functionality. Such additional functionality may be provided on a separate, removable expansion card, for example an additional graphics card, network card, host adaptor, or specialized processing card.

Each expansion bus 724 may be implemented using any technology known in the art for data communication between a CPU and an expansion device adapter. For example, the expansion bus 724 may transmit and receive electrical signals using a Peripheral Component Interconnect ("PCI") standard, a data networking standard such as an Ethernet standard, or a similar technology.

The computer 70 includes a basic input/output system ("BIOS") 725 and a Super I/O circuit 726 coupled to the low-speed bridge 72 via a bus 727. The BIOS 725 is a non-volatile memory used to initialize the hardware of the computer 70 during the power-on process. The Super I/O circuit 726 is an integrated circuit that combines input and output ("I/O") interfaces for low-speed input and output devices 728, such as a serial mouse and a keyboard. In some embodiments, BIOS functionality is incorporated in the Super I/O circuit 726 directly, obviating the need for a separate BIOS 725.

The bus 727 may be implemented using any technology known in the art for data communication between a CPU, a BIOS (if present), and a Super I/O circuit. For example, the bus 727 may be implemented using a Low Pin Count ("LPC") bus, an Industry Standard Architecture ("ISA") bus, or similar technology. The Super I/O circuit 726 is coupled to the I/O devices 728 via one or more buses 729. The buses 729 may be serial buses, parallel buses, other buses known in the art, or a combination of these, depending on the type of I/O devices 728 coupled to the computer 70.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A method of deploying a pre-production database into a production environment, the method comprising:
in response to receiving commands from a pre-production user and a production user, by a transition management processor comprising hardware, the transition management processor:
retrieving, from a data storage repository according to a best practices workflow, a sequence of processes that implement each received command;
for each process in the retrieved sequence, configuring a database analysis module according to whether the command pertains to the pre-production environment or the production environment, then executing the process using the database analysis module to produce a report; and
transmitting, to the respective commanding user, a response based on the produced reports;
wherein one of the commands received from the production user in response to the produced reports causes the pre-production database to be used by applications executing in the production environment during a stabilization period in which the pre-production database is maintained by the pre-production user; and
wherein after the transition management processor determines that the stabilization period has elapsed successfully, the database is maintained by the production user.

2. The method according to claim 1, further comprising the transition management processor storing the produced reports in the data storage repository.

3. The method according to claim 1, wherein a first sequence of the processes in the retrieved sequence comprises automatically, in the pre-production environment: predicting common transition errors when the database is used by applications executing in the production environment, auditing compliance of data in the database in accordance with the production environment, and validating a maintenance plan.

4. The method according to claim 3, wherein the common transition errors include data connection errors, or insufficient disk space errors, or invalid database indexes, or database users having improper data access permissions, or data lookup performance errors, or unused data errors, or improper database software patching errors, or any combination thereof.

5. The method according to claim 3, wherein a second sequence of the processes comprises repeatedly requesting manual review by the production user of the reports of the predicting, auditing and validating processes, until the production user either approves or rejects each such process.

6. The method according to claim 5, wherein repeatedly requesting comprises transmitting one or more emails to the production user, to a manager of the production user, or both.

7. The method according to claim 6, wherein a third sequence of the processes comprises, after the production user approves the predicting, auditing, and validating processes, transmitting a stabilization period beginning email to the pre-production user.

8. The method according to claim 7, wherein a fourth sequence of the database analysis processes comprises, waiting a fixed duration after transmitting the stabilization period beginning email, then transmitting a stabilization period ending email to the pre-production user and to the production user.

9. The method according to claim 3, wherein predicting the common transition errors is performed by a machine learning module.

10. The method according to claim 9, wherein the machine learning module operates by determining information about the database and an operating system in the pre-production environment using which the database is executing.

11. The method according to claim 10, wherein the machine learning module further operates by performing an automated analysis of the operating system to compute operating system parameters.

12. The method according to claim 11, wherein the machine learning module further operates by performing an automated analysis of the database to compute database parameters.

13. The method according to claim 12, wherein the machine learning module further operates by classifying the operating system parameters and the database parameters according to a model for predicting the common transition errors.

14. The method according to claim 13, wherein the machine learning module further operates by training the model according to the classification.

15. The method according to claim 13, wherein the machine learning module further operates by generating reports, based on the classification, of a transition failure prediction, of potential problems caused by the common issues, and of the pre-production environment.

16. The method according to claim 15, wherein the machine learning module further operates by transmitting the generated reports to the pre-production user.

17. A system for deploying a pre-production database into a production environment, the system comprising:

a plurality of modules, each module for performing a respective process;

a data storage repository for storing associations between each of a plurality of commands and a corresponding plurality of configurable sequences of the processes that implement the command; and a transition management processor comprising hardware for, in response to receiving commands from a pre-production user and a production user:

retrieving, from the data storage repository according to a best practices workflow, the sequence of processes that implement the received command;

for each process in the retrieved sequence, configuring the respective module in the plurality of modules according to whether the command pertains to the pre-production environment or the production environment, then executing the process using the respective module to produce a report; and transmitting, to the respective user, a response based on the produced reports;

wherein one of the commands received from the production user in response to the produced reports causes the pre-production database to be used by applications executing in the production environment during a stabilization period in which the pre-production database is maintained by the pre-production user; and wherein after the transition management processor determines that the stabilization period has elapsed successfully, the database is maintained by the production user.

18. The system according to claim 17, wherein the data storage repository comprises a database.

19. The system according to claim 17, wherein the plurality of modules includes a module that predicts common transition failures according to a machine learning model.

\* \* \* \* \*